G. VON POST

RECORDING WEIGHING SCALE

Filed May 27, 1921 7 Sheets-Sheet 4

1,505,111

INVENTOR
Gustaf von Post
by T. F. Bourne
Attorney

Aug. 19, 1924. 1,505,111

G. VON POST

RECORDING WEIGHING SCALE

Filed May 27, 1921    7 Sheets-Sheet 5

INVENTOR
Gustaf von Post
BY his ATTORNEY
T. F. Bourne

Patented Aug. 19, 1924.

1,505,111

UNITED STATES PATENT OFFICE.

GUSTAF von POST, OF NEW YORK, N. Y.; ANNA von POST, EXECUTRIX OF SAID GUSTAF von POST, DECEASED, ASSIGNOR TO AKTIEBOLAGET ORIGINAL-ODHNER, OF GOTTENBORG, SWEDEN, A CORPORATION OF SWEDEN.

RECORDING WEIGHING SCALE.

Application filed May 27, 1921. Serial No. 473,005.

*To all whom it may concern:*

Be it known that I, GUSTAF VON POST, a subject of the King of Sweden, and resident of New York city, in the county of New York and State of New York, have invented certain new and useful Improvements in Recording Weighing Scales, of which the following is a specification.

The object of my invention is to provide weighing mechanism with improved means to record on paper or tickets, at will, the weight of an article being weighed without interfering in any way with the free operation of the weighing mechanism; to cause automatic feeding of the paper strip and imprinting of the same, and to automatically cut off the strip for the desired tickets.

My invention comprises novel details of improvement and combination of parts that will be more fully hereinafter set forth and then pointed out in the claims.

Reference is to be had to the accompanying drawings forming part hereof, wherein Fig. 1ª is an enlarged elevation of a portion thereof; Fig. 7ª is similar sectional view with the printing mechanism in working position.

Similar numerals of reference indicate corresponding parts in the several views.

Figure 1:
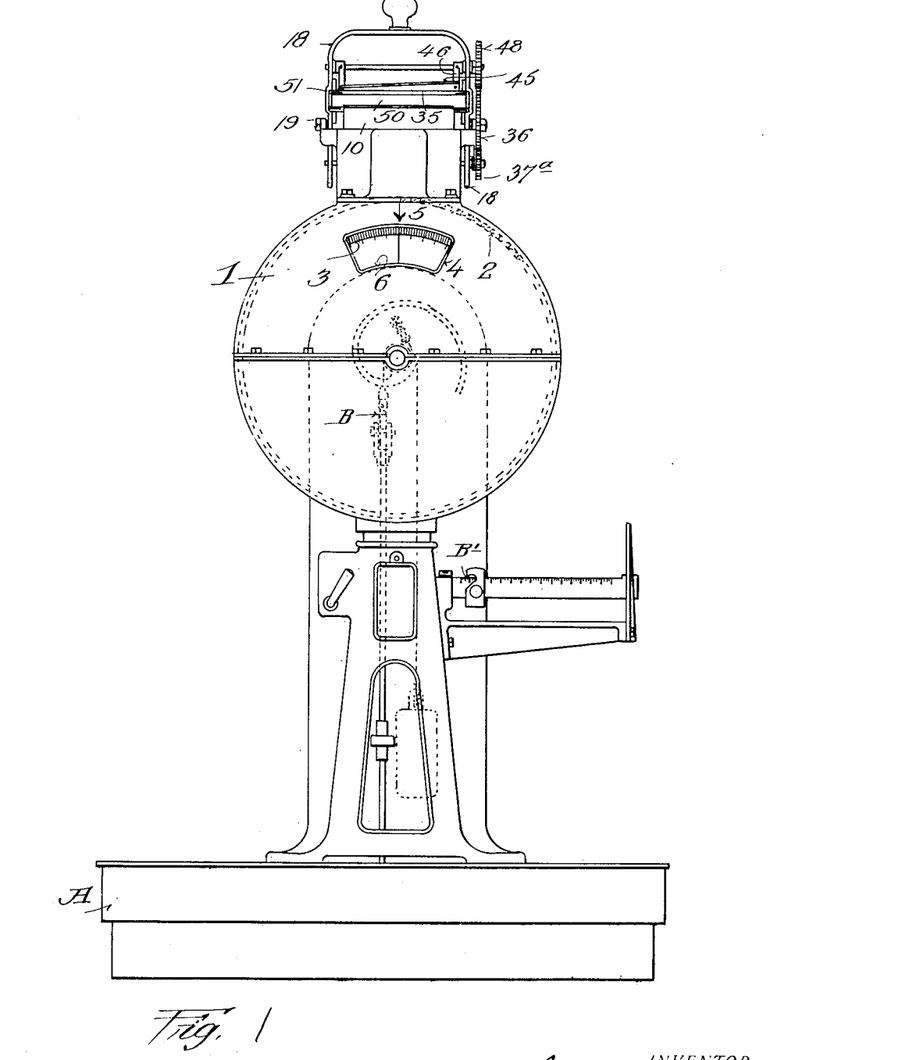
Figure 1 is a front elevation of a weighing machine embodying my invention.

At 1 is indicated the frame or casing of the scale which may be of any suitable or usual construction, the same being shown provided with a rotative member or drum 2, supported to rotate in any well known manner. Any suitable weighing devices may be provided in the scale for rotating member 2 in accordance with the weight of an article being weighed. In Fig. 1 I have illustrated a platform A for the articles to be weighed and operating devices at B between the platform and drum 2 for rotating the latter. In the example illustrated member 2 is provided with a scale 3 adapted to be seen through an opening 4 in casing 1, in connection with a stationary indicator 5, preferably through a transparent protecting piece 6, (Figs. 1, 1ª, 3 and 6). The member 2 is provided with several series of annularly disposed operating surfaces 7, arranged in ring-like form around the periphery of member 2, for causing operation of number or register wheels or discs 8. The surfaces 7 are arranged in accordance with units, tens, hundreds, etc., to be indicated on the number wheels 8. Said surfaces may be arranged as follows: A projection 7ª is provided for each of the digits or units up to 10 having stepped surfaces 7ᵇ, there being a projection 7ª for each series of ten units around member 2; for each of the projections 7ª of the tens, arranged in series, are projections 7ᶜ having stepped surfaces 7ᵈ, similarly recurring for each hundred units; series of stepped projections 7ᵉ are arranged for hundreds, another stepped series of projections 7ᶠ are arranged for thousands, and so on for higher numbers corresponding to the number wheels 8. When member 2 is rotated and brought to rest at a position corresponding to the weight of an article being weighed member 2 will come to rest with its stepped surfaces opposed to slidable plungers or pins 9 carried by a box-shaped frame 10 that is guided to reciprocate in frame or casing 1, Figs. 6 to 8 and 11. The plungers 9 are guided in bearings 11, and have shoulders 9ª to engage stopbar 11ª to limit movement of the plungers toward member 2. Bar 11ª forms part of the bearings 11 and may be detachably secured in place by screws 11ᵇ, Figs. 8 and 9. Springs 12 attached to stops 13 are connected to segmental rack members 14, as by projections 14ª on said members which co-operate with corresponding plungers 9, the springs normally tending to retain the rack members in normal position pressing against the corresponding plungers 9 to retain their shoulders 9ª against stop 11ª, Figs 8 and 9. The plungers in a row are radial to the drum and the racks bear freely on the upper ends of the plungers. The rack members 14 are pivotally supported at 15 respectively within member 10, the parts 9, 12 and 14 partaking in the reciprocating movement of frame 10. Each rack 14 meshes with a corresponding gear 16, journaled upon shaft 8ª of the number wheels 8, which shaft is journaled in frame 10. As illustrated in Fig. 8 one of the number wheels 8 is secured to shaft 8ª, as is also its corresponding gear 16, and the other gears 16 have sleeves or hubs 17 nested upon shaft 8ª, journaled one upon another, and secured respectively to the corresponding number wheels 8, whereby as said gears are rotated by the corresponding racks 14 the corresponding number wheels will be similarly rotated. The construction described provides a simple and convenient means for independently rotating each number wheel by means of its corresponding gear when frame 10 is moved to cause plungers 9 to engage the stepped surfaces 7ᵇ, 7ᵈ, etc.

Figure 6:
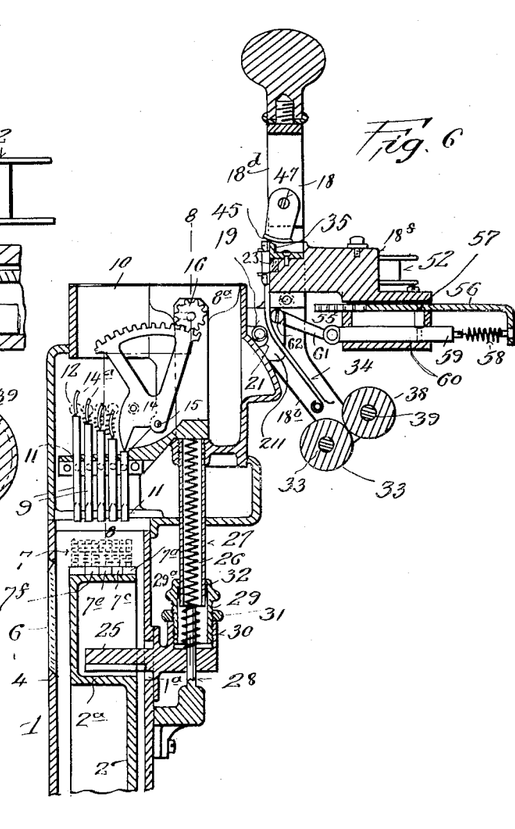
Fig. 6 a vertical section on the line 6—6 of Fig. 1.
Figure 7:
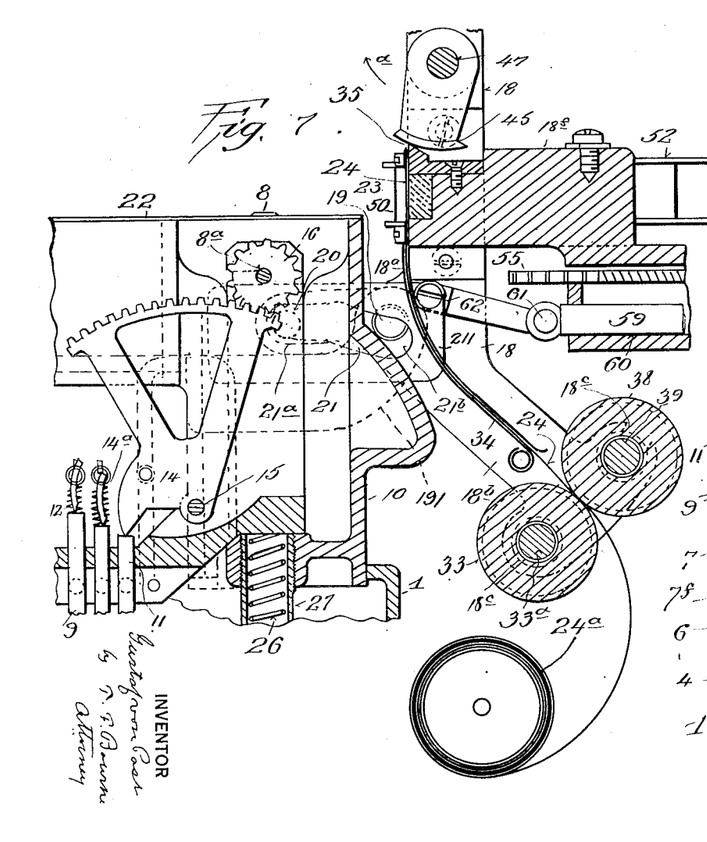
Fig. 7 is a detail enlargement of part of Fig. 6.
Figure 8:
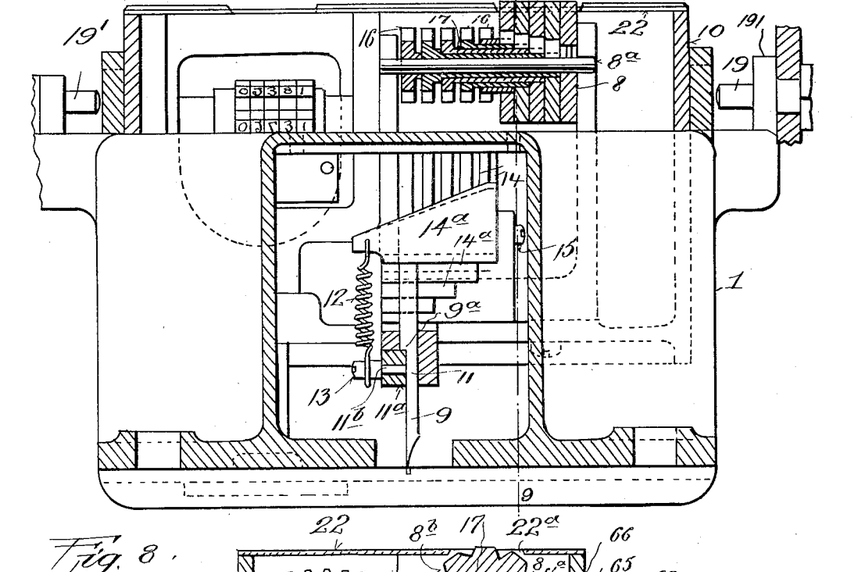
Fig. 8 is a vertical section on the line 8—8 of Fig. 6.
Figure 9:
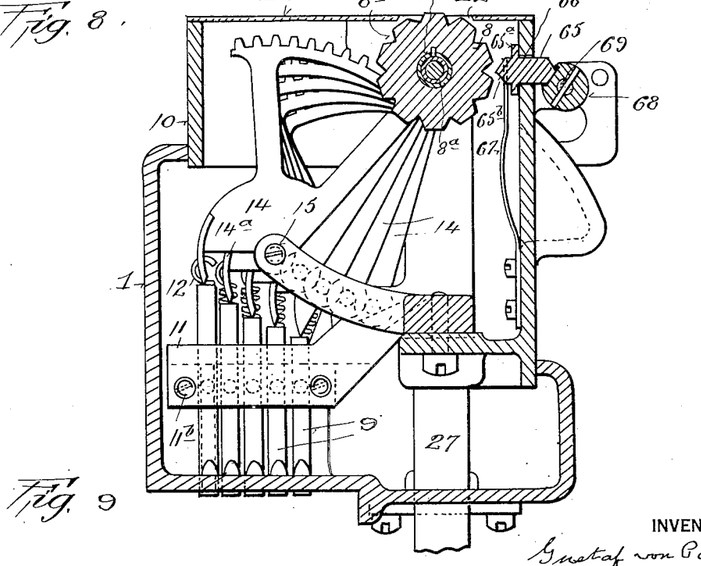
Fig. 9 is a vertical section on line 9—9 of Fig. 8.
Figure 10:
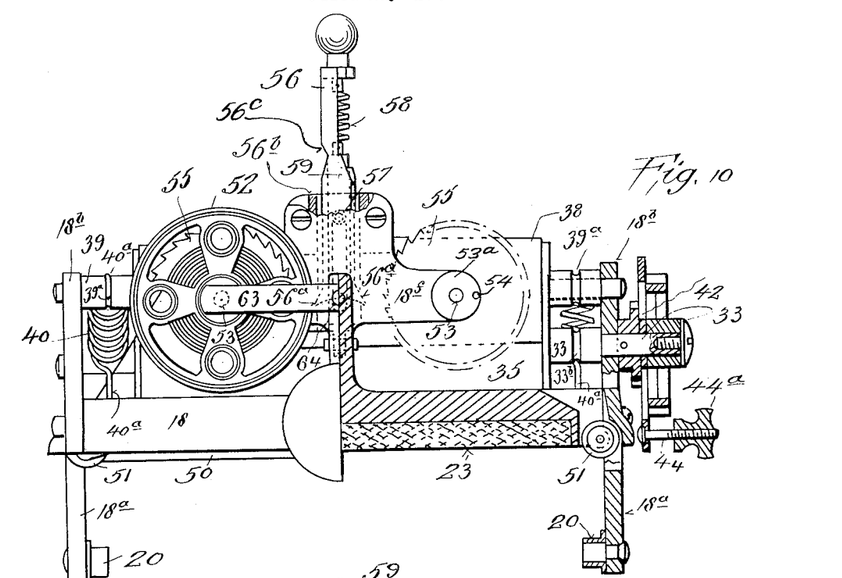
Fig. 10 is a partly sectional plan view.
Figure 11:
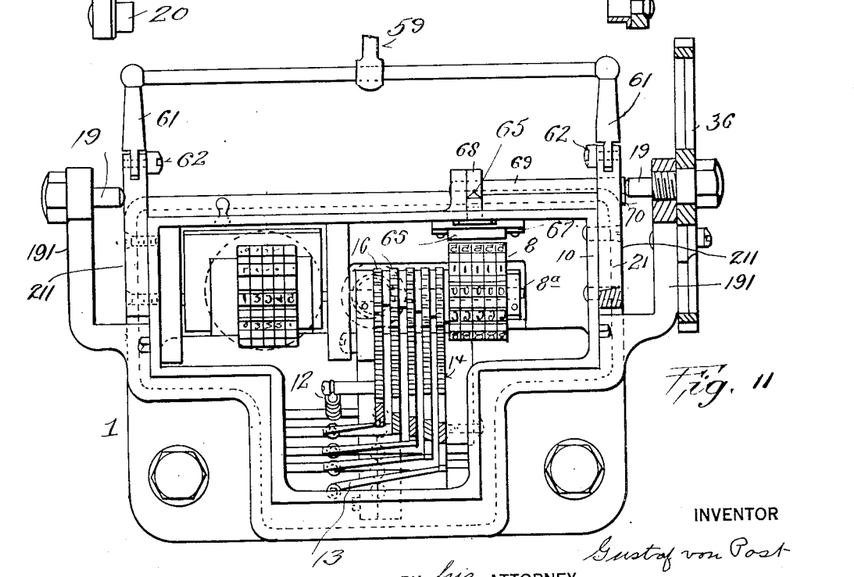
Fig. 11 is a plan view, parts being removed.
Figure 12:
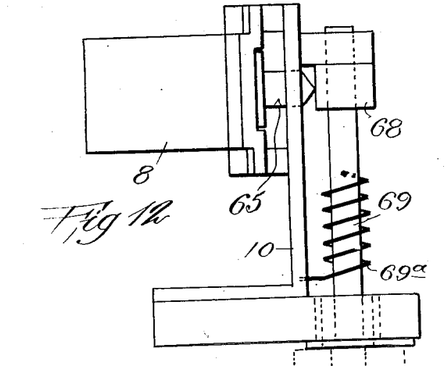
Fig. 12 is an enlarged detail plan view.
Figure 13:
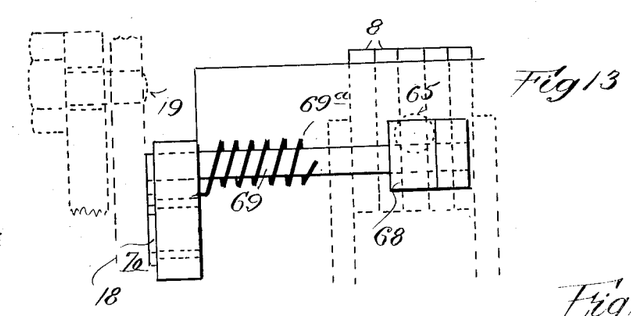
Fig. 13 is a side view of Fig. 12.

Frame 10 is reciprocated by means of a lever 18 that is journaled upon pins 19 carried by projecting arms 191 on the main frame Figs. 7, 8 and 11, which lever has spaced forwardly extending arms 18ª which have projections 20 that operate in slots 21 produced in plates 211 secured to frame 10, Figs. 6, 7, and 10. When lever 18 is in the normal or raised position (Figs. 1, 2, 6 and 7), the frame 10, with the parts carried thereby, will be elevated and when lever 13 is swung to the left, (Figs. 2 and 6), the projections 20, operating in slots 21, will cause depression of frame 10 toward member 2. The forward portions 21ª of slots 21 are so shaped that frame 10 will be depressed to the work during part of the aforesaid movement of lever 18 (to come to rest) and the rear portions 21ᵇ of slots 21 are so shaped that during a continued downward movement of lever 18 frame 10 will stop and not be moved any farther toward member 2, thereby permitting lever 18 to have movement for printing, etc., (Fig. 7). Frame 10 is shown with a shield 22 having an opening 22ª through which the adjacent portions of number wheels 8 project, (Figs. 8 and 9), in position to be impressed by a pad 23 carried by lever 18 (Fig. 7), to impress a paper strip 24 upon the type of wheels 8. A brake member 25 (Fig. 6) is adapted to engage an annular surface 2ª of member 2 to retain the latter in set position when frame 10 is depressed, during printing movement of lever 18. Brake member 25 is slidably disposed respecting frame 1, being shown operative in an opening 1ª in said frame, and is normally pressed toward surface 2ª by spring 26 which is shown within a tube 27 depending from frame 10 (Figs. 6 and 7). A guide pin 28 carried by frame 1 receives the lower end of spring 26 as well as tube 27 and a sleeve 29 secured to brake member 25, as by threads at 30, being retained in position by a nut 31. Sleeve 29 has an inturned stop portion 29ª to engage a collar 32 secured near the lower end of tube 27. The construction is such that when tube 27 rises with frame 10 the brake member 25 will be raised from brake surface 2ª, and when frame 10 descends said brake member will engage surface 2ª with pressure from spring 26. Tube 27 may slide as necessary with respect to sleeve 29.

Figures 5, 5A, 7A:
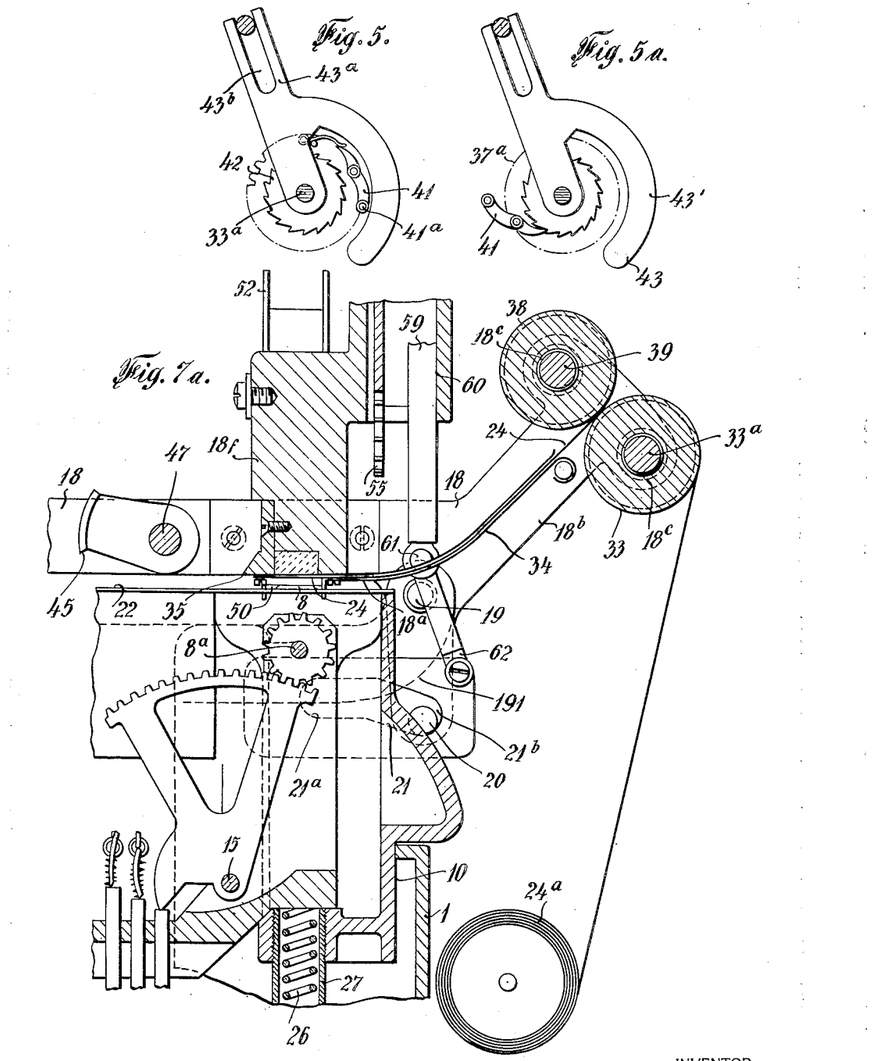
Figs. 5 and 5ª are side views looking from the left in Fig. 4 with the operating dog in different positions.
Figure 16:
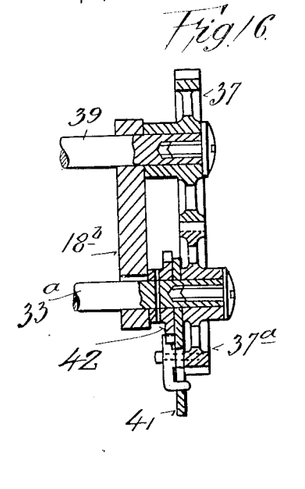
Fig. 16 is a section on line 16, 16 in Fig. 2.

Paper strip 24 is in the form of a roll 24ª suitably supported, and passes over a roll 33 secured upon shaft 33ª journaled between arms 18ᵇ of lever 18, (Figs. 7, 10 and 16). The strip passes from the roll between spaced guides 34 secured on arms 18ᵇ, and extends across in front of pad 23, past a stationary cutter 35 on lever 18, in position to be pressed against wheels 8, (Fig. 7). The strip is fed forwardly during the movement of lever 18 away from wheels 8 to a cut-off position respecting cutter 35, and released when the desired extent of paper has been fed. For feeding the strip as desired I provide a stationary gear wheel 36, secured upon frame 1, coaxially with the pins 19 (Fig. 2), and a gear 37 loosely journaled on arm 18ᵇ meshes with gear 36 and with a gear 37ª on shaft 33 for rotating shaft 33 to feed strip 24. An idle roll 38 is journaled upon arms 18ᵇ of lever 18, the shaft 39 of said roll being carried in slots 18ᶜ of said arms, (Fig. 7), so that said roll 38 may bear frictionally against strip 24 to push it against roll 33 for feeding the strip. By preference springs 40 connect the shafts 33ª and 39 to produce the desired pressure between rolls 33 and 38. Said springs are shown in the form of helices having hook-like ends at 40ª received in grooves 33ᵇ, 39ª of shafts 33ª, 39, (Fig. 10), the hook-like parts bearing against said shafts in said grooves with friction to resist back-running of the shafts and to cause them to stop rotation at the proper time. Gear 37ª carriers a spring pressed dog 41 that in normal position is held out of engagement with a ratchet wheel 42, Fig. 5, but which engages said ratchet wheel, Fig. 5ª, when the lever 18 has been moved to printing position, so that rotation of gear 37ª as it is carried around gear 36 by the operation of lever 18 away from the printing position will cause corresponding rotation of shaft 33ª and feeding of strip 24. When the strip has been fed the desired amount the dog 41 is released from rachet wheel 42. To control the operation of dog 41 at the proper time I provide an abutment 43 to cooperate with the projecting end portion 41ᵃ of said dog, (Figs. 5 and 5ᵃ). The abutment 43 shown in the form of a curved member in the path of projection 41ᵃ, said member being pivotally supported upon shaft 33ᵃ and having a projecting end portion 43ᵃ, provided with a slot 43ᵇ, shown radially disposed respecting shaft 33ᵃ. Slot 43ᵇ receives a controlling screw or stop 44 that is adjustable in a slot 36ᵃ in wheel 36, by means of nut 44ᵃ. Pin 44 has a groove 44ᵇ (Fig. 4) receiving the slotted end of member 43, and a shoulder 44ᶜ to bear against wheel 36. The arrangement is such that as lever 18 is withdrawn from printing position the gear 37ᵃ will carry dog 41 toward the curved portion 43' of member 43 faster than said member is rotated on shaft 33ᵃ, so that after projection 41ᵃ engages the curved part of member 43 the dog will be released from ratchet 42. The time of engagement of projection 41ᵃ with member 43 will be in accordance with the position of pin 44 respecting shaft 33ᵃ. The nearer pin 44 is set to shaft 33ᵃ the longer will be the independent movement of member 43 relatively to the rotation of dog 41 for the release of ratchet 42 to cause the greater feed of strip 24, and the farther pin 44 is from shaft 33ᵃ the sooner projection 41ᵃ will engage member 43 for less feeding of strip 24, and so on between said limits of setting pin 44, for feeding the strip in proportion for the desired length of ticket to be cut from the strip after it is printed. On movement of lever 18 toward printing position dog 41 will travel freely over ratchet 42, ready for the next strip feeding operation, on return of the lever, and so on.

Figures 1, 2, 3, 4:
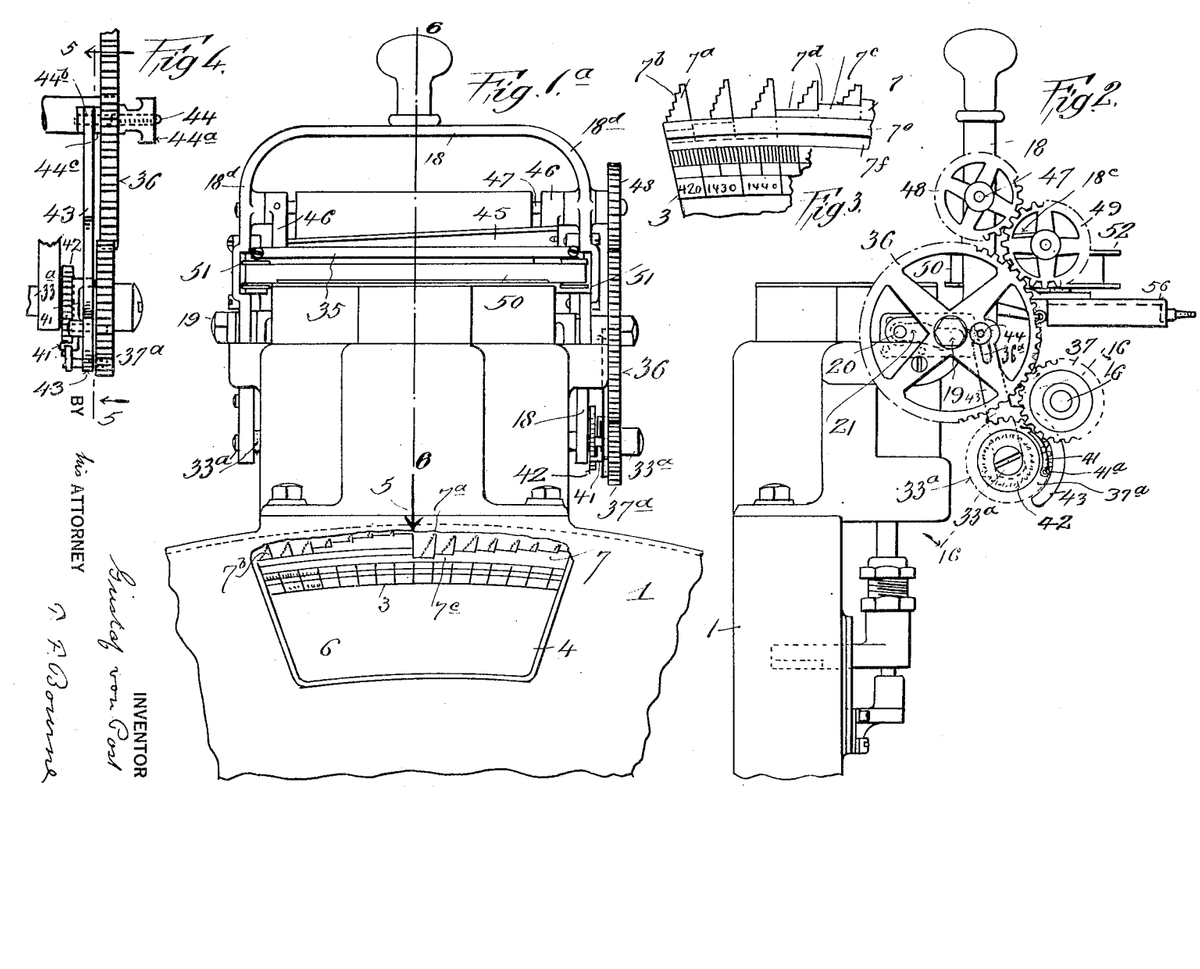
Fig. 2 is a side view of Fig. 1.
Fig. 3 is an enlarged detail of part of Fig. 1.
Fig. 4 is an enlarged detail edge view of devices for controlling the feed of the paper.

After each impression on strip 24 it may be severed transversely to provide individual tickets to represent the weight of each weighing operation. A cutter 45 is carried by spaced arms 46 secured on shaft 47 journaled between the yoke-like arms 18ᵈ of lever 18, (Figs. 1, 6 and 7). Cutter 45 is adapted to co-operate with cutter 35 to sever strip 24. Shaft 47 is shown provided with a gear 48 in mesh with a gear 49 journaled on an arm 18ᵉ of lever 18 and in mesh with gear 36, (Fig. 2). The arrangement is such that when lever 18 is swung toward the printing position the gear 49 will roll on gear 36 to cause gear 48 to rotate to swing cutter 45 about 180° away from stationary cutter 35 (in the direction of arrow a in Fig. 7), after a portion of strip 24 has been printed, and upon the return stroke of lever 18, (to the upright position) the strip is fed and comes to rest through the release of dog 41ᵃ while knife 45 is being swung toward cutter 35 by the reverse action of gears 48, 49 respecting gear 36. Before lever 18 comes to rest the two cutters will sever the printed portion of strip 24 to produce the desired printed ticket.

By preference an ink-ribbon 50 is guided between the number wheels 8 and pad 23 in front of the portion of strip 24 to be printed. Said ribbon passes over spaced guide rolls 51 journaled on lever 18 and is carried by spools 52, 52 detachably mounted on shafts 53 journaled on rearward arm 18ᶠ of lever 18 (Fig. 10). Pins 54 on flanges 53ᵃ of shafts 53 detachably engage the spools 52 to rotate them. Each shaft 53 has a ratchet 55 (oppositely disposed) respectively adapted to be engaged by the corresponding projecting part 56ᵃ of dog 56 (Figs. 6, 7, and 10). Dog 56 is pivoted at 57 on slide member 59 and is normally held in an oblique position to either of the ratchets 56, to the right or left, Fig. 10, by a tension spring 58 connected with said dog and with centrally disposed slide member 59 (Fig. 6). When dog 56 is swung to one side or the other it will be retained in such position by spring 58. Slide member 59 is guided to reciprocate in bearing 60 on arm 18ᶠ (Figs. 6 and 7). Member 59 is pivotally connected by link 61 with frame 10, at 62. When lever 18 is swung toward the printing position the slide member will be drawn by the link by reason of the differential movement of lever 18 and frame 10 to cause dog 56 to rotate a ratchet 55 to rotate a spool 52, and on the return of said lever the dog will slip past the ratchet ready for another feeding operation. Dog 56 is provided with spaced inclined portions 56ᶜ, adapted to engage corresponding stop 56ᵇ on arm 18ᶠ, when the dog is advanced, to allow the dog when it is advanced first to tilt sufficiently to engage the ratchet 55 and then by engagement with a corresponding stop 56ᵇ on arm 18ᶠ to again disengage the projection 56ᵃ of the dog from ratchet 55 to prevent excess feeding of the ribbon upon an operation of the dog. By shifting dog 56 from one side to the other it may be caused to engage either of the ratchets 55 for winding the ribbon from one direction or the other upon the corresponding spool 52. A spring 63 is pivotally carried at 64 by lever 18 and extends over the shafts 53 to retain the spools 52. Said spring may be moved to side for replacement of the ribbon spools. Springs 63 form also frictional brakes for the spools and prevent rotation of said spools when the dog 56 returns.

Figure 14:
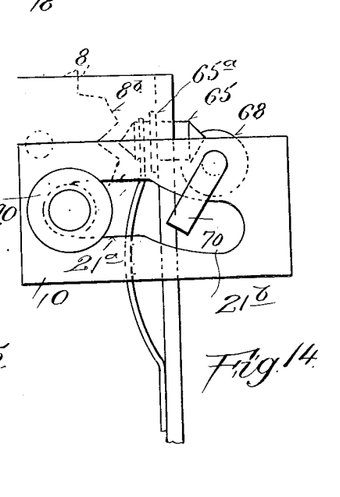
Figs. 14 and 15 are side views of Fig. 13, showing parts in different positions.
Figure 15:
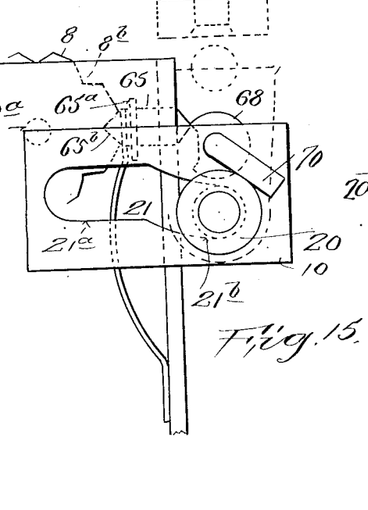

In order to retain the number wheels 8 in proper relative position and to cause the numbers to register in a row, when lever 18 is brought to the printing position, I provide means to engage said wheels temporarily. Spaces 8ᵇ are provided between the type of number wheels 8 (Fig. 9), adapted to receive a dog 65 that is movably carried by frame 10 in position adjacent to said wheels, (Figs. 9 and 11). Said dog is shown slidably supported in an opening 66 in frame 10 (Fig. 9) and having stop shoulder 65ᵃ to bear against said frame as pressed by springs 67 carried by frame 10. Dog 65 engages a cam-like member 68 on a rock-shaft 69 journaled upon frame 10, which rock-shaft has a projection 70 to be engaged by a projection 20 on lever 18 when said lever is pressed to the printing position, to actuate the cam, (Figs. 14 and 15). A spring 69ᵃ restores the cam. Said spring may be connected to frame 10 and shaft 69. The arrangement is such that after frame 10 has been depressed by lever 18 to the printing position to rotate the number wheels 8 and the movement of said lever is continued with projections 20 operating in portions 21ᵇ of slots 21, a projection 20 will engage the projection 70 to cause cam 68 to be rotated to push dog 65 against wheels 8 to retain said wheels during the printing operation, the movement of dog 65, by reason of its tapered end 65ᵇ engaging the adjacent spaces 8ᵇ of wheels 8, causing the numbers on said wheels to be brought into line or register for printing. When the outer end of dog 65 engages the periphery of cam 68 said dog will be pushed no farther toward wheels 8, by reasons of the circular periphery of said cam, to prevent injury to the parts. The cam is restored from operated position by means of spring 69ᵃ.

The operation may be described as follows: In the normal position of the parts lever 18 will be raised and frame 10 will be elevated, the number wheels 8 all being at zero, the plungers 9 being depressed and resting against stop 11ᵃ, the end portion of strip 24 to be printed being in front of pad 23, brake member 25 being raised from rim 2ᵃ and dog 65 being retracted from the number wheels. The object to be weighed having been placed upon the goods receiver the member or drum 2 will be rotated the appropriate distance to bring its indicator 3 of the weight in register with indicator 5, whereupon the appropriate surfaces 7 will be brought to rest opposite the plungers 9, in accordance with the weight of the article to be recorded. Lever 18 will be swung toward the number wheels and the projections 20, operating in the slots 21 for part of their length, will cause depression of frame 10. Brake 25 will be applied to drum 2ᵃ to retain the latter and plungers 9 will engage the appropriated stepped surfaces 7, etc., during said movement of frame 10 to cause rack members 14 to rotate the corresponding number wheels to bring their numerals in register to indicate the weight. Continued movement of lever 18 will maintain frame 10 in the aforesaid depressed position, the projections 20 traveling in the arcuate portions 21ᵇ of slots 21, which projections will operate projection 70 to cause dog 65 to enter recesses 8ᵇ of wheels 8, whereupon pad 23 will impress strip 24 against the type of wheels 8 presented for recording, the strip being printed by the interposed ribbon to indicate on the strip the weight of the article being weighed. During the aforesaid movement of lever 18 the cutter 45 is operated away from cutter 35 and dog 41 will slide freely over ratchet 42. Upon the return stroke of lever 18 the dog 41 will engage ratchet 42 to cause feeding of the strip 24 to pass its previously printed portion beyond cutter 35. When projection 41ᵃ of dog 41 overtakes and engages member 43 the dog will be released from ratchet 42 to stop the feed of strip 24, and cutter 45 will operate with cutter to sever the strip to produce the printed ticket. During the to and fro swinging of lever 18 the dog 56 will operate one of the ratchets 55 to feed the inking ribbon.

My improvements afford free operation of the weighing mechanism without interference by the recording devices, and the latter are simply and effectively controlled by the to and fro swinging of lever 18 to cause the printing on the strip 24, the feeding of the latter the required extent, the cutting off of the printed portion for the ticket, and the feeding of the inking ribbon, without any attention by the operator other than actuating lever 18.

Changes may be made in the details of construction set forth within the scope of the appended claims without departing from the spirit of my invention.

Having now described my invention, what I claim is:

1. Recording mechanism for weighing scales comprising in combination number wheels adapted to be set corresponding to the weight of goods to be recorded, and means including a lever to operate said wheels and provided with guiding means for a paper strip and with means to impress the strip against said wheels to record their numbers upon the strip.

2. Recording mechanism for weighing scales comprising in combination number wheels adapted to be set corresponding to the weight of goods to be recorded, means including a lever to operate said wheels and provided with guiding means for a paper strip and with means to impress the strip against said wheels to record their numbers upon the strip, and means to sever said strip after such impression.

3. Recording mechanism for weighing scales comprising in combination number wheels adapted to be set corresponding to the weight of goods to be recorded, means including a lever to operate said wheels and provided with guiding means for a paper strip and with means to impress the strip against said wheels to record their numbers upon the strip, cutting means for the strip carried by the lever, and means actuated by the operation of said lever to operate said cutting means.

4. Recording mechanism for weighing scales comprising in combination number wheels adapted to be set corresponding to the weight of goods to be recorded, means including a lever to operate said wheels and provided with guiding means for a paper strip and with means to impress the strip against said wheels to record their numbers upon the strip, cutting means for the strip carried by the lever, means actuated by the operation of said lever to operate said cutting means, and means carried by said lever to feed said strip.

5. Recording mechanism for weighing scales comprising in combination number wheels adapted to be set corresponding to the weight of goods to be recorded, means including a lever to operate said wheels and provided with guiding means for a paper strip and with means to impress the strip against said wheels to record their numbers upon the strip, strip feeding means carried by the lever to feed the strip during one movement of the lever, and means actuated by the lever to sever the strip.

6. Recording mechanism for weighing scales comprising in combination number wheels adapted to be set corresponding to the weight of goods to be recorded, means including a lever to operate said wheels and provided with guiding means for a paper strip and with means to impress the strip against said wheels to record their numbers upon the strip, strip feeding means carried by the lever to feed the strip during one movement of the lever, and cutting means carried by the lever to sever the strip on the reverse movement of the lever.

7. Recording mechanism for weighing scales comprising in combination number wheels adapted to be set corresponding to the weight of goods to be recorded, means including a lever to operate said wheels and provided with guiding means for a paper strip and with means to impress the strip against said wheels to record their numbers upon the strip, strip feeding rolls carried by said lever, gearing carried by the lever, a gear to actuate said gearing, a dog connected with one gear and a ratchet connected with one roll, and means to release the dog from the ratchet to determine the feed of the strip.

8. The combination of weighing mechanism provided with stepped surfaces corresponding to weight of goods to be recorded, a frame movable relatively to said stepped surfaces, number wheels carried by said frame, means cooperative between said stepped surfaces and said wheels for operating the latter by the former, a lever to operate said frame and provided with means to impress a strip against said wheels to record the numbers upon the strip, strip feeding rolls carried by said lever, gearing carried by the lever, a gear to actuate said gearing, a dog connected with one gear and a ratchet connected with one roll, a member movably carried by the lever to operate the dog to release the ratchet, and means to control the movement of said member relatively to said dog.

9. The combination of weighing mechanism provided with stepped surfaces corresponding to weight of goods to be recorded, a frame movable relatively to said stepped surfaces, number wheels carried by said frame, means cooperative between said stepped surfaces and said wheels for operating the latter by the former, a lever to operate said frame and provided with means to impress a strip against said wheels to record their numbers upon the strip, strip feeding rolls carried by said lever, gearing carried by the lever, a gear to actuate said gearing, a dog connected with one gear and a ratchet connected with one roll, a member movably carried by the lever to operate the dog to release the ratchet, and a stop adjustable on said gear to cooperate with said member to control the movement of the latter relatively to said dog.

10. The combination of weighing mechanism provided with stepped surfaces corresponding to weight of goods to be recorded, a frame movable relatively to said stepped surfaces, number wheels carried by said frame, means cooperative between said stepped surfaces and said wheels for operating the latter by the former, a lever to operate said frame and provided with means to impress a strip against said wheels to record their numbers upon the strip, strip feeding rolls carried by said lever, gearing carried by the lever, a gear to actuate said gearing, a dog connected with one gear and a ratchet connected with one roll, a member movably carried by the lever to operate the dog to release the ratchet, said member having a slot, and a stop adjustably secured on said gear to receive said slot to control the movement of said member relatively to said dog.

11. Recording mechanism for weighing scales comprising in combination number wheels adapted to be set corresponding to the weight of goods to be recorded, means including a lever to operate said wheels and provided with guiding means for a paper strip and with means to impress the strip against said wheels to record their numbers upon the strip, strip feeding means carried by the lever to feed the strip during one movement of the lever, a cutter on the lever, a cutter pivotally carried by the lever to sever the strip, and gearing to actuate the pivotal cutter on a reverse movement of the lever.

12. Recording mechanism for weighing scales comprising in combination number wheels adapted to be set corresponding to the weight of goods to be recorded, means including a lever to operate said wheels and provided with guiding means for a paper strip and with means to impress the strip against said wheels to record their numbers upon the strip, strip feeding means carried by the lever to feed the strip during one movement of the lever, a cutter on the lever, a cutter pivotally carried by the lever to sever the strip, gearing carried by the lever to actuate the pivotal cutter, and a gear to actuate said gearing upon movement of the lever to operate the pivotal cutter in opposite directions.

13. Recording mechanism for weighing scales comprising in combination number wheels adapted to be set corresponding to the weight of goods to be recorded, means including a lever to operate said wheels and provided with guiding means for a paper strip and with means to impress the strip against said wheels to record their numbers upon the strip, ink-ribbon spools carried by said lever, and means carried by said lever operative during movement of the latter to actuate a ribbon spool.

14. Recording mechanism for weighing scales comprising in combination number wheels adapted to be set corresponding to the weight of goods to be recorded, means including a lever to operate said wheels and provided with guiding means for a paper strip and with means to impress the strip against said wheels to record their numbers upon the strip, ink-ribbon wheels carried by said lever, ratchets connected with said spools, a dog pivotally carried by said lever to actuate said ratchets, resilient means to retain said dog in operative relation to either of said ratchets, and means movably connecting said dog with said frame.

15. The combination of weighing mechanism having a frame, number wheels, means operative between the number wheels and part of the weighing mechanism to actuate said wheels, a lever to cause operation of said means, strip feeding means carried by said lever, means to cause operating of said feeding means during movement of said lever, and means carried by the lever to impress the strip against said wheels.

16. The combination of weighing mechanism having a frame, number wheels, means operative between the number wheels and part of the weighing mechanism to actuate said wheels, a lever to cause operation of said means, strip feeding means carried by said lever, and a gear carried by said frame to actuate said strip feeding means during movement of the lever.

17. The combination of weighing mechanism having a frame, number wheels, means operative between the number wheels and part of the weighing mechanism to actuate said wheels, a lever to cause operation of said means, strip feeding means carried by said lever comprising a pair of opposed rolls for the strip, a ratchet connected with one roll, a gear carrying the ratchet, a dog carried by the gear to actuate the ratchet, means to release the dog from the ratchet to stop feeding the strip, and gearing to actuate the first named gear during operation of the lever.

18. The combination of weighing mechanism having a frame, number wheels, means operative between the number wheels and part of the weighing mechanism to actuate said wheels, a lever to cause operation of said means, strip feeding means carried by said lever comprising a pair of opposed rolls for the strip, a ratchet connected with one roll, a gear carrying the ratchet, a dog carried by the gear to actuate the ratchet, a member movably carried by the lever to release the dog from the ratchet, means to cause axial movement of said member relatively to the dog during movement of the lever, and gearing to actuate the first named gear during operation of the lever.

19. The combination of weighing mechanism having a frame, number wheels, means operative between the number wheels and part of the weighing mechanism to actuate said wheels, a lever to cause operation of said means, strip feeding means carried by said lever, means to cause operation of said feeding means during movement of said lever, strip cutting means carried by the lever, and means to actuate the cutting means during operation of the lever.

20. The combination of weighing mechanism having a frame, number wheels, means operative between the number wheels and part of the weighing mechanism to actuate said wheels, a lever to cause operation of said means, strip guiding and feeding means carried by said lever, means to cause operation of said feeding means during movement of said lever, a stationary cutter and a movable cutter carried by the lever to sever the strip, gears carried by the lever and a stationary gear to cause to and fro movement of the movable cutter during alternate movement of the lever.

21. The combination of weighing mechanism having a drum provided with stepped surfaces, a frame movable relatively to said drum and having number wheels and means to actuate said wheels in cooperation with said stepped surfaces, said frame having slots, a lever having projections to operate in said slots to actuate the frame, and strip guiding and feeding means carried by the lever.

22. The combination of weighing mechanism having a drum provided with stepped surfaces, a frame movable relatively to said drum and having number wheels and means to actuate said wheels in cooperation with said stepped surfaces, said frame having slots, a lever having projections to operate in said slots to actuate the frame, and strip guiding and feeding means carried by the lever, said slots having arcuate portions to permit movement of the lever for impressing the strip against the number wheels without actuating said frame.

Signed at New York city, in the county of New York, and State of New York, this 11th day of May, A. D. 1921.

GUSTAF von POST.